United States Patent [19]

Gill

[11] 4,220,177

[45] Sep. 2, 1980

[54] OFFSHORE LOADING SYSTEM WITH ARTICULATED MANIFOLDS

[75] Inventor: William A. Gill, El Toro, Calif.

[73] Assignee: FMC Corporation, San Jose, Calif.

[21] Appl. No.: 867,635

[22] Filed: Jan. 9, 1978

[30] Foreign Application Priority Data

Feb. 8, 1977 [GB] United Kingdom ................. 5068/77

[51] Int. Cl.[2] ........................... B67D 5/00; F16L 3/00

[52] U.S. Cl. ..................................... 137/615; 141/387

[58] Field of Search ................ 137/615; 141/387, 388, 141/279, 284; 285/282

[56] References Cited

U.S. PATENT DOCUMENTS

| | | | |
|---|---|---|---|
| 3,047,016 | 7/1962 | Andresen | 137/615 |
| 3,050,092 | 8/1962 | Palearis | 137/615 |
| 3,489,174 | 1/1970 | Cooley, Jr. | 137/615 |
| 3,675,680 | 7/1972 | Frohlich et al. | 137/615 |
| 3,799,197 | 3/1974 | Gibbons | 137/615 |
| 3,889,728 | 6/1975 | Riche | 141/387 |
| 3,942,554 | 3/1976 | Werner et al. | 137/615 |
| 3,976,092 | 8/1976 | Coja et al. | 137/615 |
| 4,090,538 | 5/1978 | Kotcharian | 141/387 |
| 4,121,616 | 10/1978 | Lochte et al. | 137/615 |

*Primary Examiner*—Martin P. Schwadron
*Assistant Examiner*—A. Michael Chambers
*Attorney, Agent, or Firm*—Lloyd B. Guernsey; W. William Ritt, Jr.

[57] ABSTRACT

An offshore loading system especially suited for transferring petroleum from a floating storage and loading terminal to a marine tanker. The system comprises a support boom pivotally mounted on the deck of the terminal, a pair of fluid conduits extending generally horizontally along the boom from risers at the deck, a pair of vertical fluid conduits slidably connected to the outboard end of the boom and a pair of articulated manifold assemblies connected between the lower ends of the vertical conduits and the marine tanker. The outboard end of the horizontal conduits are articulated and are connected by swivel joints to the vertical conduits to facilitate raising and lowering the vertical conduits relative to the outboard end of the boom. The articulated manifold assemblies accommodate relative horizontal movement between the tanker and the loading terminal so that the horizontal position of the fluid conduits remains constant and simple and relatively light-weight fluid conduits may be used with the support boom.

10 Claims, 5 Drawing Figures

OFFSHORE LOADING SYSTEM WITH ARTICULATED MANIFOLDS

BACKGROUND OF THE INVENTION

1. Field of the Invention

This invention relates to fluid loading systems and more particularly, to loading systems with articulated tanker manifolds for transferring fluid between an offshore terminal and a marine tanker.

2. Description of the Prior Art

The production of oil and gas from offshore wells has developed into a major endeavor of the petroleum industry, and this growth has lead to the development of means for transporting petroleum products from offshore wells to shore-based refineries or storage facilities. Many of the wells are being drilled and completed in deepwater locations where the use of marine tankers of very large capacity constitutes the most practical and efficient method of transporting the petroleum products.

Some of the prior art loading facilities include a fluid handling means such as a fixed mooring buoy or a floating platform to which a tanker may be moored while loading. The tanker and the floating platform move relative to each other during the loading operation due to winds, tides and the amount of fluid which is loaded into the tanker. The height of the tanker above the waterline changes as the tanker is loaded or unloaded, thus requiring that a flexible or articulated hose be connected between the tanker and the floating platform. When flexible hoses are used a tender is normally required to assist the tanker in picking up the flexible hoses for connection to the tanker's manifold. Such an arrangement not only requires the use of a tender, but movement of the tanker may cause the flexible hoses to be broken. Also the hoses are bulky, heavy, hard to handle and require a relatively large crew of workers to connect the hose to the tanker.

Some of the other prior art loading facilities include a marine loading arm having relatively complex articulated arms that are heavy, bulky, relatively expensive and require complex balancing systems, as the balance of these arms changes as the fluid content of the arm changes. The prior art systems must also provide special restraints to prevent the fluid conduits from swinging rapidly into a vertical position when the system is disconnected from the tanker manifold.

SUMMARY OF THE INVENTION

The present invention comprises an offshore loading system for transferring fluid from a first fluid handling means to a second handling means, and to provide for relative movement between the two handling means. This invention overcomes some of the disadvantages of the prior art by employing a tower or other suitable vertical support structure that is mounted on a platform or other first fluid handling means, and a generally horizontally-disposed support boom having one end thereof connected to the tower or support structure. A generally horizontal conduit member having an articulated portion at the outboard end is mounted on the support boom. The outboard end of the horizontal conduit member is pivotally connected to the upper end of a vertical conduit member which is slidably connected to the outboard end of the support boom. A support cable means for supporting the weight of the vertical conduit member and the fluid therein is connected so that the vertical conduit member can be raised and lowered in accordance with the relative movement between the support beam and the second fluid handling means. The lower end of the vertical conduit member is pivotally connected to the outboard end of an articulated manifold assembly which is, in turn, connected to the second fluid handling means. The use of the combination of articulated conduits mounted on the floating platform and articulated manifolds on the tanker compensates for both vertical and horizontal movement between the tanker and the floating platform. The articulated manifolds compensate for horizontal movement between the tanker and the platform so that the vertical conduit member can be maintained in a true vertical position. This means that special restraints are not required to prevent the conduit from swinging as the conduit is disconnected from the tanker manifolds.

DESCRIPTION OF THE PREFERRED EMBODIMENT

Figure 1:
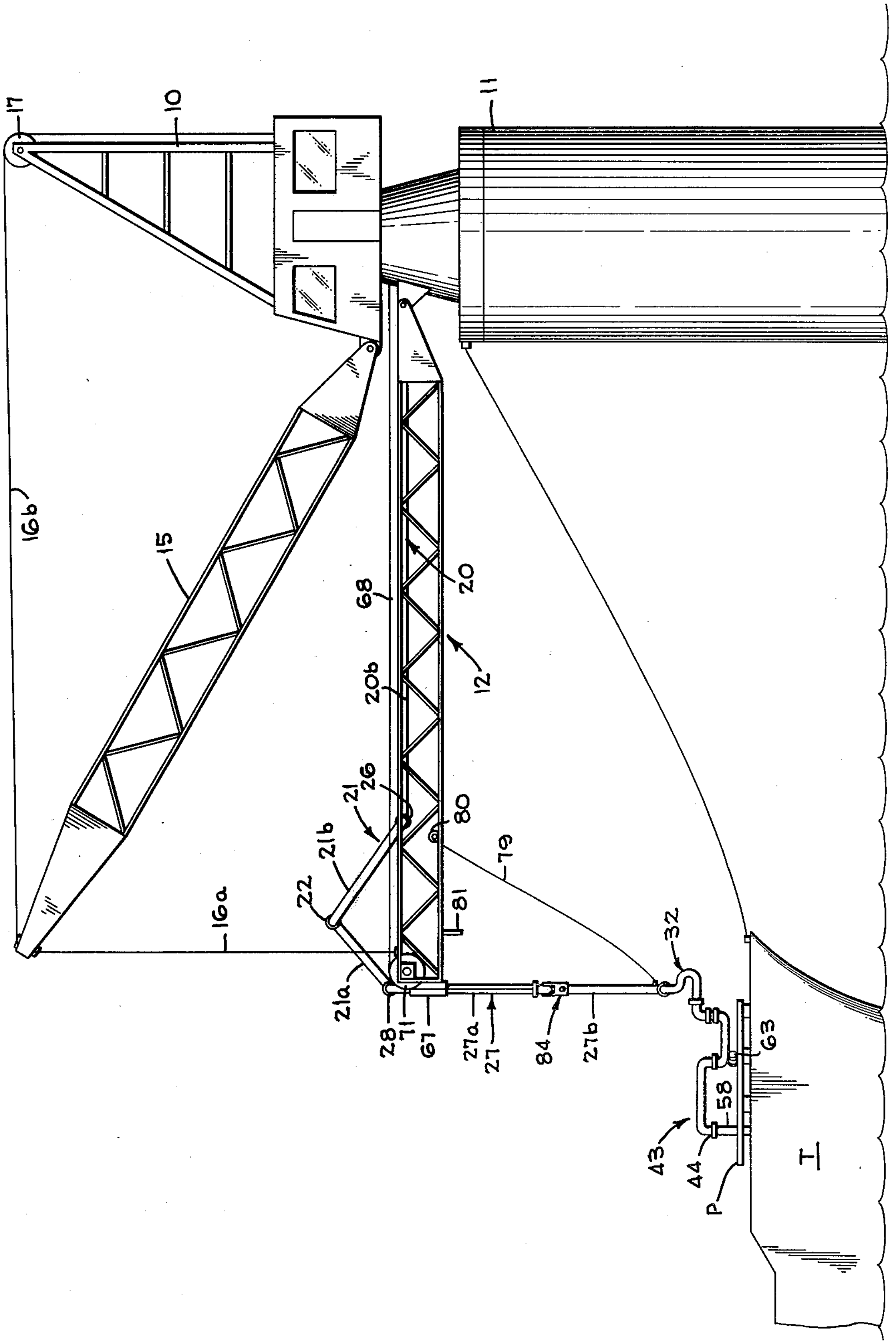
FIG. 1 is a side elevation of an offshore loading system with articulated manifolds according to the present invention, with the vertical conduit member shown connected in operating position to a marine tanker.

An offshore loading system with articulated manifolds according to the present invention comprises a tower or other suitable vertical support structure 10 (FIG. 1) mounted on the top of a platform 11 and having a generally horizontally-disposed support boom 12 pivotally connected at the inboard end thereof to the platform 11. The support boom 12 is retained in a nearly horizontal position by a mast 15, a pair of boom support cables **16*a*, 16*b* and a sheave 17. The inboard end of the mast 15 is pivotally connected to the tower 10 at a point slightly above the inboard end of the support boom. The vertical support cable 16*a* is connected between the outboard end of the support boom 12 and the outboard end of the mast so that the height of the outboard end of the boom is determined by the height of the outboard end of the mast 15. The cable 16*b* is connected to the outboard end of the mast 15, is threaded over a sheave 17** and connected to the usual counterbalance and winch arrangement (not shown), which is commonly used in the fluid loading art. The details of these commonly used devices are not considered to be a part of this invention.

A pipe assembly 20 (FIGS. 2 and 3) includes a pair of sets of pipes with each set comprising a generally horizontal rigid boom conduit member **20*b*, having the inboard end thereof connected to a U-connector 19 which is connected atop a single vertical conduit member 20*a* that extends downward through the tower 10 and the platform 11 to a fluid source (not shown). The boom conduit member includes an articulated left end portion (FIG. 2) comprising a jumper assembly 21 having a pair of conduit members 21*a*, 21*b*** connected by a swivel joint 22. The jumper assembly is connected to the boom conduit member 20*b* by a swivel joint 26 and is connected to a vertical conduit member 27 by a swivel joint 28. The vertical conduit member includes a pair of conduit pipes 27*a*, 27*b* connected by a swivel joint 29 to facilitate movement of the conduit member 27 into the stowed position shown by the phantom lines of FIG. 2. The vertical conduit member carries at its lower end a triple pipe swivel joint assembly 32 (FIGS. 1, 2, 4) comprising first, second and third swivel joints 33, 34 and 35 respectively, a plurality of 90° pipe elbows 39*a*–39*e* and a short piece of pipe 40. The joint assembly 32 is connected to the outboard end of an articulated manifold 43 mounted on a tanker T.

The tanker T is secured to the platform 11 by one or more mooring lines which allow the tanker to swing freely according to the dictates of wind and current and to retain the tanker a proper distance from the platform while the tanker is loaded through the pipe assembly. Mounted on the deck D of the tanker is a platform P which supports a pair of articulated manifolds 43 and 43′.

Each of the articulated manifolds 43, 43′ include a pair of swivel joints 44, 45, and a pair of lengths of pipe 49,50 interconnected by a plurality of pipe elbows 52-55. The swivel joint 44 is connected between the elbow 52 and a length of pipe 58 extending upward from below the deck D of the tanker T. The articulated manifold is supported near its midpoint for movement over the platform P by a pair of support wheels 63 which are rotatably connected to the underside of the elbow 54. Since the wheels move directly over the surface of the platform, a safe envelope E (FIG. 3) over which the manifold can be moved without damage to either the manifold or the loading arm, can be painted on the platform. The tanker operator can check to see that the outboard end of the manifold does not extend outside this safe envelope. Also a pressure-sensitive tape (not shown) may be placed around the edges of a zone in which the support wheels may safely move and the tape coupled to an electric alarm system (not shown) to provide an audible alarm signal when the support wheels 63 reach the tape.

The upper portion of the vertical conduit pipe 27*a* is slidably mounted inside a collar 67 which is welded or otherwise connected to the outboard end of the support boom 12. The vertical conduit member 27 is supported, raised and lowered by a cable 68 (FIGS. 2, 4) which is connected to an ear 69 that is welded or otherwise fixed to the lower end of the vertical conduit pipe 27*a*. The cable is threaded over a pair of sheaves 71, 72 (FIG. 2) and connected to a counterweight 75 and a winch 76. The sheave 71 is rotatably mounted on a pin 73 (FIGS. 2, 4) which is connected to a pair of bearings 66*a*, 66*b* which are welded to the outboard end of the boom 12. The sheave 72 is rotatably mounted on the upper portion of the platform 11 by a pin 74. The counterweight 75 supports a major portion of the weight of the vertical conduit member 27 so that a relatively small winch 76 can be used to raise the vertical conduit member and move the jumper pipe assembly 21 into the stowed position shown in the phantom lines of FIG. 2. A tag line 79 is connected between the lower end of the vertical conduit member 27 and a winch 80, with the winch 80 being mounted on the left portion of the boom 12. The winch and tag line are used to pull the lower portion 27*b* of the conduit member and the triple pipe joint assembly 32 into the stowed position, shown in FIG. 2, where the conduit member 27*b* rests in the groove 81*a* (FIG. 4) of a bracket 81. The bracket 81 is mounted on the lower side of the boom 12.

Figure 2:
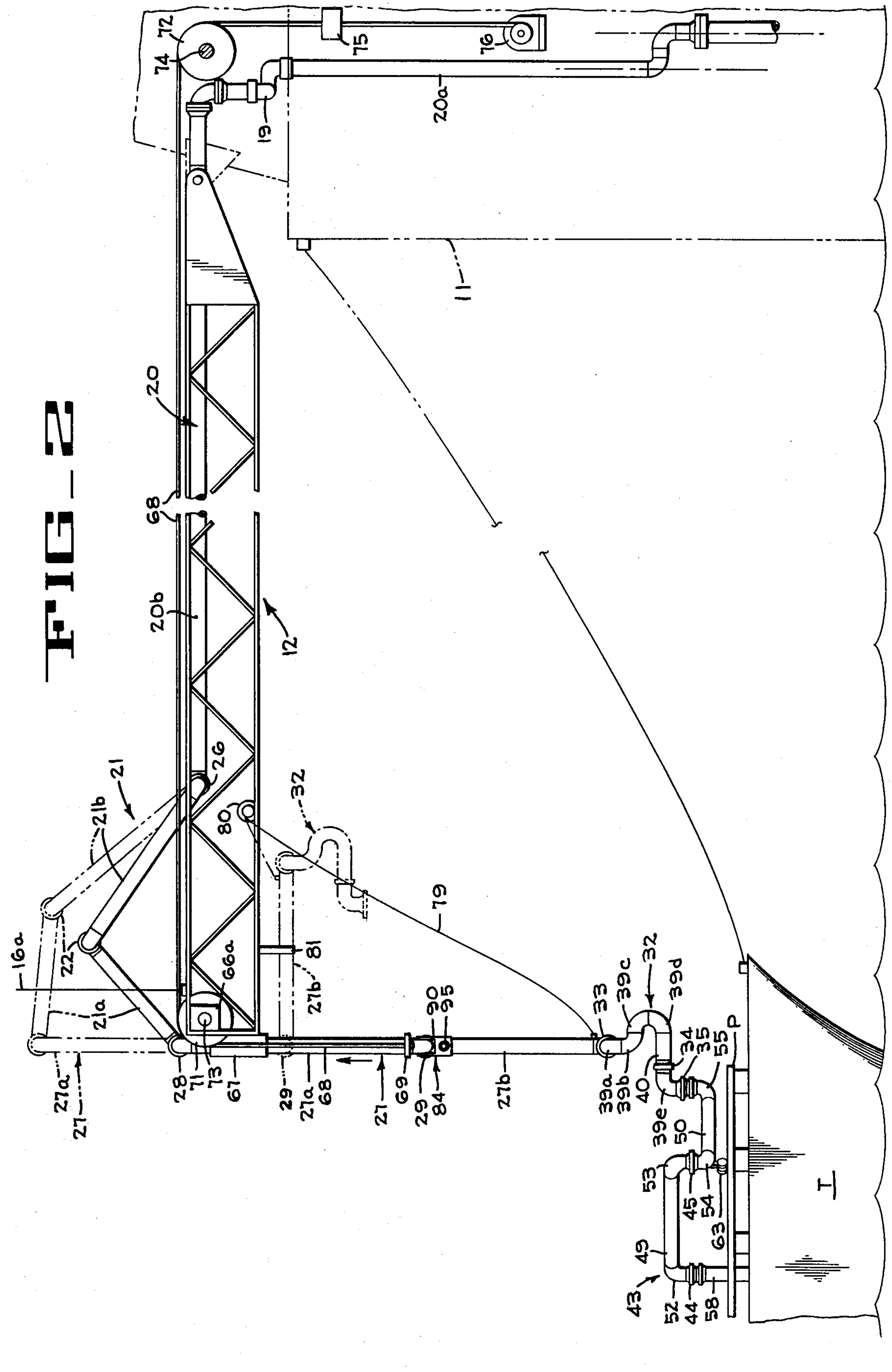
FIG. 2 is an enlarged side elevation of a portion of the offshore loading system shown in FIG. 1.
Figure 3:
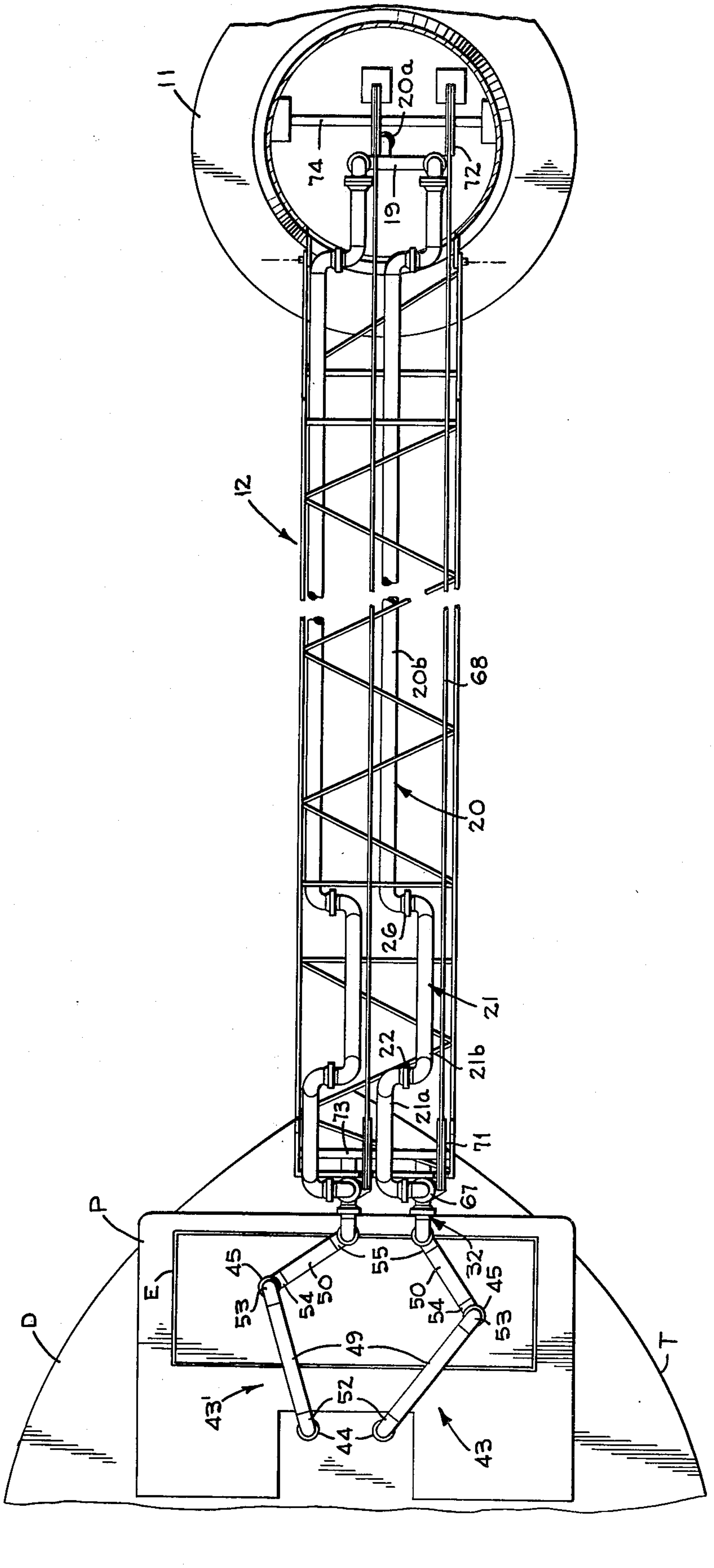
FIG. 3 is a plan view of the offshore loading system shown in FIG. 2.
Figure 4:
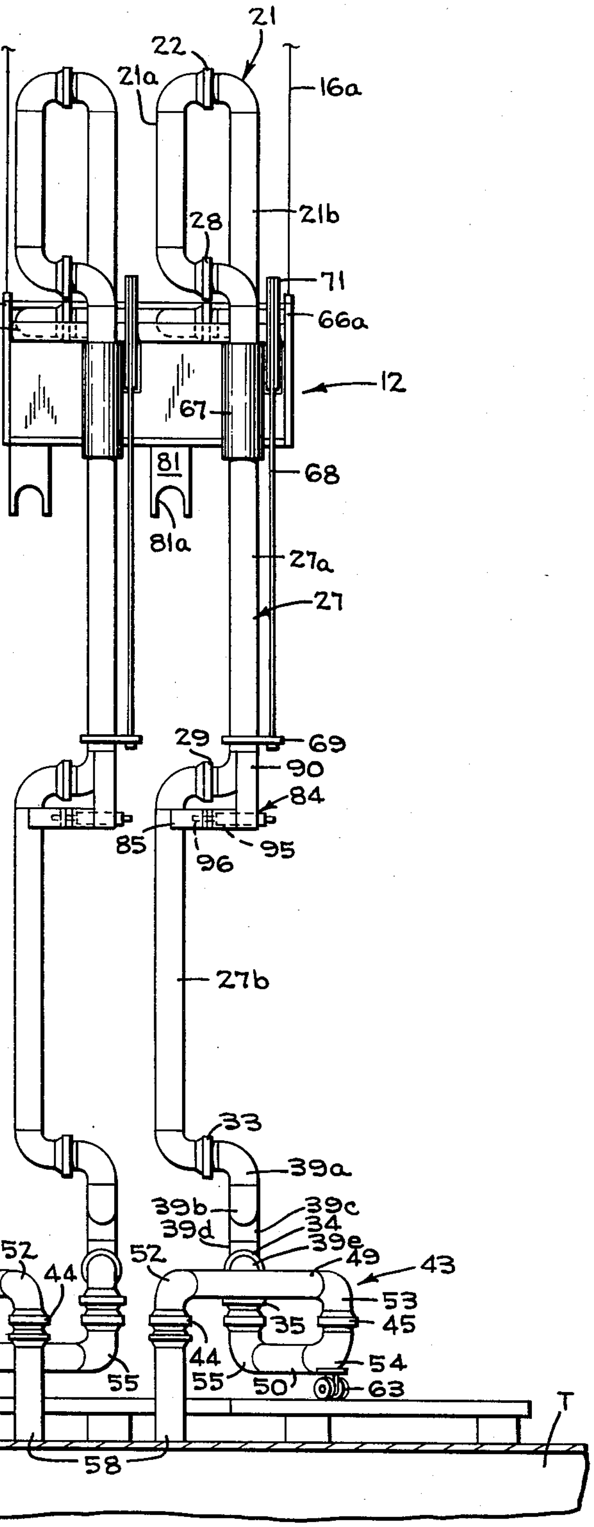
FIG. 4 is a front elevation of the offshore loading system shown in FIG. 2.
Figure 5:
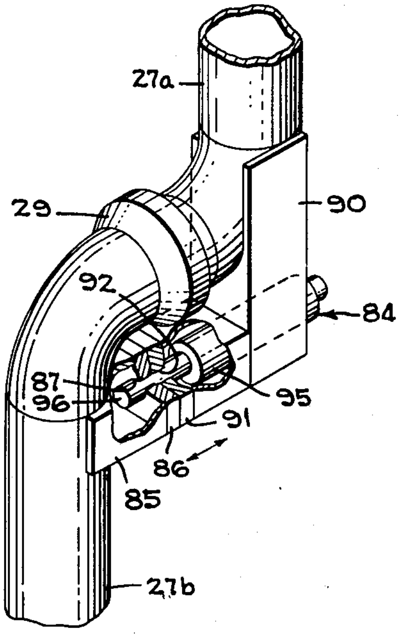
FIG. 5 is an isometric drawing of the mechanism used to lock the vertical conduit in working position.

When the apparatus is in the working position, as shown by the solid lines of FIGS. 2 and 4, the lower portion 27*b* of the conduit member is secured in a vertical position by a locking device 84 (FIGS. 4, 5). The locking device 84 includes a bracket 85 having an end plate 86 mounted at one end thereof with a bore 87 extending through the plate 86, and having the other end of the bracket 85 welded or otherwise connected to the lower portion 27*b* of the conduit member 27. An angle bracket 90 is welded or otherwise connected to the lower end of the upper portion 27*a* of the conduit member. The free end of the bracket 90 is enclosed by an end plate 91 having a bore 92 therein. A hydraulic cylinder 95 is mounted in the angle bracket 90 with a rod 96 aligned with the bore 92 in the end plate 91. When the upper portion 27*a* and the lower portion 27*b* of the conduit member are in the working portion (FIG. 2) the bores 87 and 92 are aligned so that the rod 96 can be extended through both of the bores to lock the upper and lower portions 27*a*, 27*b* in a vertical working position.

When the apparatus is not in use the rod 96 is retracted and the lower portion 27*b* is moved into the stowed position (FIG. 2) by the winch 80 and the tag line 79. The rod 96 is extended and retracted by applying hydraulic fluid to the cylinder 95 through a pair of hydraulic lines (not shown), as is well known in the art.

Thus, the present invention provides an all-metal offshore loading system having a vertical conduit member which remains in a substantially fixed horizontal position during the fluid transfer operation and having an articulated tanker manifold which follows the relative horizontal movements between the tanker and a platform. The vertical conduit member can be moved up and down to compensate for changes in vertical positions of the tanker and the platform.

Although the best mode contemplated for carrying out the present invention has been herein shown and described, it will be apparent that modification and variation may be made without departing from what is regarded to be the subject matter of the invention.

What is claimed is:

1. An offshore loading system for transferring fluid from a first fluid handling means to a second fluid handling means and to provide for relative movement between the two handling means, said system comprising:
   - a support structure for mounting on said first fluid handling means;
   - a support boom having an inboard end connected to said support structure;
   - a boom conduit member having an articulated portion at one end thereof, said boom conduit member being mounted along said boom with said articulated portion at the outboard end of said support boom;
   - a vertical conduit member;
   - means for connecting said vertical conduit member to the outboard portion of said support boom;
   - means for pivotally connecting the upper end of said vertical conduit member to the articulated end portion of said boom conduit member;
   - an articulated manifold assembly for interconnecting a lower end of said vertical conduit member with said second fluid handling means;

said vertical conduit member includes an upper portion and a lower portion and means for pivotally connecting the lower end of said upper portion to the upper end of said lower portion, means for locking said upper portion and said lower portion together in rigid alignment for maintaining said vertical conduit member in a fixed position, said manifold assembly having pivotal means for facilitating both relative horizontal and vertical movement between the lower end of said vertical conduit member and said second fluid handling means while said vertical conduit member is maintained in a fixed position by said locking means.

2. An offshore loading system as defined in claim 1 wherein said means for pivotally connecting said upper end of said vertical conduit member to said articulated end portion of said boom member includes a plurality of conduit means between said upper end of said vertical conduit member and said articulated end portion and wherein said vertical member is slidable within a connecting means relative to said boom.

3. An offshore loading system as defined in claim 1, includes remote control means for said locking means for locking said lower portion to the upper portion of said vertical conduit to prevent horizontal movement of said lower portion relative to said upper portion while fluid is being transferred between said first and said second fluid handling means.

4. A loading system for transferring fluid from one fluid handling means to another and to provide for relative movement between the two handling means, said system comprising:

a boom conduit member, means for mounting said boom conduit member in a substantially horizontal position with an inboard end connected to a first handling means;

a vertical conduit member;

means for slidably mounting said vertical conduit member to an outboard portion of said boom conduit member with said vertical conduit member in a substantially vertical position, said mounting means facilitating vertical movement of said vertical conduit member relative to said boom conduit member;

and means for pivotally connecting an upper end of said vertical conduit member to an outboard end of said boom conduit member whereas said means for pivotally connecting said upper end of said vertical conduit member to said outboard end of said boom conduit member includes a pair of rigid members, means for pivotally interconnecting a first end of each of said rigid conduit members, means for pivotally connecting a second end of a first rigid conduit member to the upper end of said vertical conduit member, and means for pivotally connecting a second rigid conduit member to the outboard end of said boom conduit member.

5. A loading system as defined in claim 4 wherein said vertical conduit member includes an upper portion, a lower portion, and means for pivotally interconnecting said upper and lower portions of said vertical conduit member.

6. A loading system as defined in claim 5 including means for selectively locking said upper portion and said lower portion of said vertical conduit member together into a selected alignment.

7. A loading system as defined in claim 5 including means for pivoting the lower end of said lower portion upward into a stowed position.

8. A loading system as defined in claim 5 including means for selectively locking said upper portion and said lower portion of said vertical conduit member into rigid alignment.

9. A loading system as claimed in claim 2 wherein the sliding connecting means permitting vertical movement of said vertical conduit member comprises a collar mounted on said support boom and slidingly receiving the vertical conduit member therein.

10. An offshore loading system for transferring fluid from a first fluid handling means to a second fluid handling means, said system comprising: a support structure for mounting on said first fluid handling means; a support boom having an inboard end connected to said support structure; a boom conduit member having an articulated portion at one end thereof, said boom conduit member being mounted along said boom with said articulated portion at the outboard end of said support boom; a vertical conduit member; means for pivotally connecting said upper end of said vertical conduit member to said articulated end portion of said boom member including a plurality of conduit means between said upper end of said vertical conduit member and said articulated end portion and wherein said vertical member is slidable within a connecting means relative to said boom, an articulated manifold assembly for interconnecting a lower end of said vertical conduit member with said second fluid handling means; said vertical conduit member includes an upper portion and a lower portion and means for pivotally connecting said lower end of said upper portion to said upper end of said lower portion, means for locking said upper portion and said lower portion together in rigid alignment for maintaining said vertical conduit member in a fixed position, said manifold assembly having pivotal means for facilitating both relative horizontal and vertical movement between the lower end of said vertical conduit member and the second fluid handling means while said vertical conduit member is maintained in a fixed position by said locking means.

* * * * *